United States Patent
Kaja et al.

(10) Patent No.: US 10,861,457 B2
(45) Date of Patent: Dec. 8, 2020

(54) VEHICLE DIGITAL ASSISTANT AUTHENTICATION

(71) Applicant: Ford Global Technologies, LLC, Dearborn, MI (US)

(72) Inventors: Nevrus Kaja, Taylor, MI (US); Glen Munro Green, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/171,762

(22) Filed: Oct. 26, 2018

(65) Prior Publication Data

US 2020/0135190 A1    Apr. 30, 2020

(51) Int. Cl.

| G10L 15/22 | (2006.01) |
| B60K 35/00 | (2006.01) |
| G06K 9/00 | (2006.01) |
| B60W 40/08 | (2012.01) |
| G10L 17/00 | (2013.01) |

(52) U.S. Cl.
CPC .............. *G10L 15/22* (2013.01); *B60K 35/00* (2013.01); *B60W 40/08* (2013.01); *G06K 9/00288* (2013.01); *G06K 9/00838* (2013.01); *G10L 17/00* (2013.01); *B60K 2370/148* (2019.05); *B60W 2040/0809* (2013.01); *G10L 2015/223* (2013.01); *G10L 2015/227* (2013.01)

(58) Field of Classification Search
CPC . G10L 15/22; G10L 17/005; G10L 2015/223; G10L 2015/227; B60K 35/00; B60K 2370/18; B60W 40/08; B60W 2040/0809; G06K 9/00288; G06K 9/00838
See application file for complete search history.

(56) References Cited

U.S. PATENT DOCUMENTS

| 6,243,683 B1* | 6/2001 | Peters | G10L 15/24 |
| | | | 434/4 |
| 6,567,775 B1* | 5/2003 | Maali | G06K 9/6293 |
| | | | 704/231 |
| 7,472,063 B2* | 12/2008 | Nefian | G06K 9/6293 |
| | | | 382/227 |
| 7,957,542 B2* | 6/2011 | Sarrukh | G10K 11/341 |
| | | | 381/92 |
| 8,700,392 B1* | 4/2014 | Hart | G10L 15/25 |
| | | | 704/231 |
| 8,913,103 B1* | 12/2014 | Sargin | G06K 9/00335 |
| | | | 348/14.12 |
| 9,832,583 B2* | 11/2017 | Cohen | H04M 3/567 |
| 9,881,610 B2* | 1/2018 | Connell, II | G10L 15/25 |
| 9,922,646 B1* | 3/2018 | Blanksteen | G06F 3/167 |

(Continued)

FOREIGN PATENT DOCUMENTS

| JP | 2005010847 A | 1/2005 | |
| WO | WO-2017138934 A1 * | 8/2017 | ............. G10L 15/08 |
| WO | 2018009897 A1 | 1/2018 | |

*Primary Examiner* — Mohammad K Islam

(74) *Attorney, Agent, or Firm* — Michael Spenner; Brooks Kushman PC

(57) ABSTRACT

A vehicle includes a controller, programmed to responsive to detecting a voice command from a user and a location of the user inside the vehicle via a microphone, authenticate an identity of the user using facial recognition on an image captured, by a camera, of the location of the user; and responsive to a successful authentication, execute the voice command.

17 Claims, 3 Drawing Sheets

(56) References Cited

U.S. PATENT DOCUMENTS

| | | | | |
|---|---|---|---|---|
| 10,055,988 B2* | 8/2018 | Warren | | B60W 40/09 |
| 10,374,816 B1* | 8/2019 | Leblang | | H04L 12/1822 |
| 2004/0220705 A1* | 11/2004 | Basir | | B60R 21/01538 |
| | | | | 701/1 |
| 2009/0015651 A1* | 1/2009 | Togami | | H04N 7/15 |
| | | | | 348/14.01 |
| 2009/0055180 A1* | 2/2009 | Coon | | B60R 16/0373 |
| | | | | 704/251 |
| 2009/0150149 A1* | 6/2009 | Culter | | G06K 9/6293 |
| | | | | 704/246 |
| 2010/0194863 A1* | 8/2010 | Lopes | | G06T 7/12 |
| | | | | 348/50 |
| 2011/0224978 A1* | 9/2011 | Sawada | | G10L 15/32 |
| | | | | 704/231 |
| 2012/0069131 A1* | 3/2012 | Abelow | | G06Q 10/067 |
| | | | | 348/14.01 |
| 2013/0030811 A1* | 1/2013 | Olleon | | G06F 3/013 |
| | | | | 704/267 |
| 2014/0187219 A1* | 7/2014 | Yang | | H04W 4/023 |
| | | | | 455/418 |
| 2014/0365228 A1* | 12/2014 | Ng-Thow-Hing | | G06N 20/00 |
| | | | | 704/275 |
| 2015/0023256 A1* | 1/2015 | Liu | | H04L 51/38 |
| | | | | 370/329 |
| 2015/0058004 A1* | 2/2015 | Dimitriadis | | G10L 25/84 |
| | | | | 704/233 |
| 2015/0154957 A1* | 6/2015 | Nakadai | | G06F 40/58 |
| | | | | 704/235 |
| 2015/0254058 A1* | 9/2015 | Klein | | G06F 3/167 |
| | | | | 704/275 |
| 2015/0324636 A1* | 11/2015 | Bentley | | A63F 13/00 |
| | | | | 386/227 |
| 2015/0340040 A1* | 11/2015 | Mun | | G10L 25/78 |
| | | | | 704/246 |
| 2016/0064000 A1* | 3/2016 | Mizumoto | | G06K 9/4647 |
| | | | | 704/233 |
| 2016/0082839 A1* | 3/2016 | Ricci | | G05D 1/0276 |
| | | | | 701/36 |
| 2016/0100092 A1* | 4/2016 | Bohac | | H04N 7/188 |
| | | | | 382/103 |
| 2016/0132670 A1* | 5/2016 | Salama | | G06K 9/00899 |
| | | | | 726/19 |
| 2016/0140964 A1* | 5/2016 | Connell, II | | G10L 15/07 |
| | | | | 704/231 |
| 2016/0214618 A1* | 7/2016 | Wulf | | B60W 50/14 |
| 2016/0267911 A1* | 9/2016 | Koetje | | B60R 16/0373 |
| 2016/0358604 A1* | 12/2016 | Dreuw | | G10L 15/22 |
| 2017/0017501 A1 | 1/2017 | Quast | | |
| 2017/0068863 A1* | 3/2017 | Rattner | | G06K 9/00838 |
| 2017/0113627 A1* | 4/2017 | Ding | | B60R 1/08 |
| 2017/0133036 A1* | 5/2017 | Cohen | | G06T 7/73 |
| 2017/0309275 A1* | 10/2017 | Takayanagi | | G10L 15/32 |
| 2017/0309289 A1* | 10/2017 | Eronen | | H04R 3/005 |
| 2017/0351485 A1* | 12/2017 | Kohler | | A63F 13/25 |
| 2018/0018964 A1* | 1/2018 | Reilly | | G10L 15/02 |
| 2018/0059913 A1* | 3/2018 | Penilla | | H04W 12/0608 |
| 2018/0077492 A1* | 3/2018 | Yamada | | H04R 3/12 |
| 2018/0174583 A1* | 6/2018 | Zhao | | G10L 15/22 |
| 2018/0190282 A1* | 7/2018 | Mohammad | | G10L 25/84 |
| 2018/0233147 A1* | 8/2018 | Tukka | | G10L 15/22 |
| 2018/0357040 A1* | 12/2018 | Spiewla | | G06K 9/00604 |
| 2019/0018411 A1* | 1/2019 | Herbach | | H04N 7/188 |
| 2019/0037363 A1* | 1/2019 | Tzirkel-Hancock | | H04W 4/48 |
| 2019/0051304 A1* | 2/2019 | Tian | | G01S 5/00 |
| 2019/0073999 A1* | 3/2019 | Premont | | G10L 15/08 |
| 2019/0176837 A1* | 6/2019 | Williams | | B60W 50/02 |
| 2019/0265868 A1* | 8/2019 | Penilla | | B60N 2/0228 |
| 2019/0325748 A1* | 10/2019 | Tudi | | G01C 21/3697 |
| 2019/0355352 A1* | 11/2019 | Kane | | G10L 17/06 |
| 2020/0010051 A1* | 1/2020 | Dumov | | G06K 9/00617 |

* cited by examiner

VEHICLE DIGITAL ASSISTANT AUTHENTICATION

TECHNICAL FIELD

The present disclosure is generally related to a vehicle authentication system. More specifically, the present disclosure is related to a vehicle authentication system for voice commands.

BACKGROUND

Many vehicles are provided with infotainment systems supporting voice command input. A vehicle user may perform various features using voice commands such as setting navigation destination and adjusting temperatures. Currently, there are many voice command systems do not support authentications of the identity of a user. Different users (e.g. a vehicle owner and a passenger) have been given the same authority for voice commands.

SUMMARY

In one or more illustrative embodiment of the present disclosure, a vehicle includes a controller, programmed to responsive to detecting a voice command from a user and a location of the user inside the vehicle via a microphone, authenticate an identity of the user using facial recognition on an image captured, by a camera, of the location of the user; and responsive to a successful authentication, execute the voice command.

In one or more illustrative embodiment of the present disclosure, a vehicle includes a controller, programmed to responsive to detecting a door opening or closing event, detect an occupancy of the vehicle via a camera, and authenticate an identity of a first user and an identity of a second user via facial recognition on an image captured via the camera; responsive to receiving a voice command from a first user via a microphone, analyze the voice command to detect whether the voice command is occupancy-dependent based on predefined rules; and responsive to detecting the voice command is occupancy-dependent, verify if a predefined occupancy-dependent condition is met through the identity of the second user.

In one or more illustrative embodiment of the present disclosure, a method for a vehicle includes responsive to receiving an input indicative of an upcoming voice command, activating an omni-directional microphone and a camera; receiving a voice command from a user via the microphone; detecting a direction from which the voice command is received via the microphone; capturing an image inside a vehicle cabin via the camera; authenticating an identity of the user by facial recognition on the image based on the direction received from the microphone; and responsive to a successful authentication, executing the voice command.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle voice command authorization system. More specifically, the present disclosure proposes a vehicle voice command authorization system using image recognition technologies.

Figure 1:
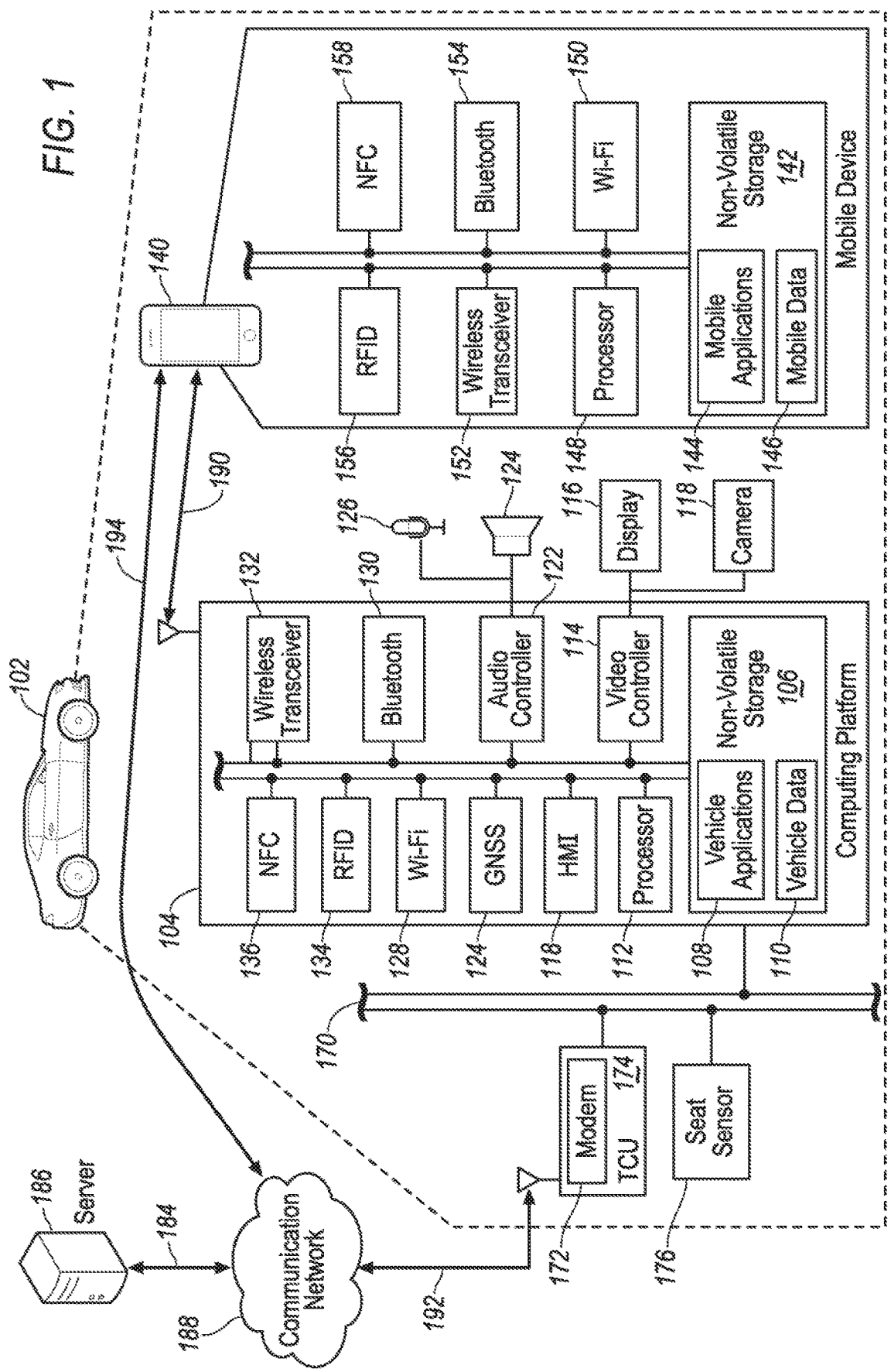
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, alert, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 120 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may further drive or otherwise communicate with one or more interior cameras 118 configured to capture video images of vehicle occupants inside the cabin by way of the video controller 114. For instance, the interior camera 118 may be located on the windshield facing rearward configured to capture facial images of the occupants of the vehicle 102. The camera 118 may be further provided with a movable feature through a motor or the like configured to allow the camera 118 to move/rotate and focus on a specific portion of the vehicle cabin. Additionally or alternatively, in case that the vehicle 102 is a large vehicle such as a three-row SUV, multiple cameras may be used to capture facial images of occupants in different rows.

The computing platform 104 may also drive or otherwise communicate with one or more speakers 124 and microphones 126 configured to provide audio output and input to and from vehicle occupants by way of an audio controller 122. The microphone 126 may be provided with direction-detecting features to detect the direction and/or location of the audio input. As an example, the direction-detecting feature may be implemented via multiple sound sensors arranged in one or more microphone assemblies configured to calculate the direction of a sound source using volume differences and time delays. For instance, responsive to detecting a user is making a voice command to the computing platform 104 via the microphone 126, a direction signal is generated sent to the computing platform 104 to determine the location of the user inside the vehicle cabin (e.g. a driver seat, a rear-right passenger seat or the like). The microphone 126 may be a single microphone assembly located inside the vehicle cabin such as the middle portion of the vehicle cabin to better detect the direction of the voice command. Alternatively, the microphone 126 may include multiple microphone assemblies input sensors located at different locations inside the vehicle cabin. In this case, the audio controller 122 may be further configured to process the voice input from multiple sensors and calculate the direction or location of the source such via volume or the like.

The computing platform 104 may be configured to wirelessly communicate with a mobile device 140 of the vehicle users/occupants via a wireless connection 190. The mobile device 140 may be any of various types of portable computing device, such as cellular phones, tablet computers, wearable devices, smart watches, laptop computers, portable music players, or other device capable of communication with the computing platform 104. The wireless transceiver 132 may be in communication with a WiFi controller 128, a Bluetooth controller 130, a radio-frequency identification (RFID) controller 134, a near-field communication (NFC) controller 136, and other controllers such as a Zigbee transceiver, an IrDA transceiver (not shown), and configured to communicate with a compatible wireless transceiver 152 of the mobile device 140.

The mobile device 140 may be provided with a processor 148 configured to perform instructions, commands, and other routines in support of the processes such as navigation, telephone, wireless communication, and multi-media processing. The mobile device 140 may be provided with a wireless transceiver 152 in communication with a WiFi controller 150, a Bluetooth controller 154, a RFID controller 156, a NFC controller 158, and other controllers (not shown), configured to communicate with the wireless transceiver 132 of the computing platform 104.

The computing platform 104 may be further configured to communicate with various vehicle components via one or more in-vehicle network 170. The in-vehicle network 170 may include, but is not limited to, one or more of a controller area network (CAN), an Ethernet network, and a media-oriented system transport (MOST), as some examples.

The computing platform 104 may be configured to communicate with a telematics control unit (TCU) 174 configured to control telecommunication between vehicle 102 and a communication network 188 through a wireless connection 192 using a modem 172. The communication network 188 may be any type of wireless network such as a cellular network enabling the communication between a remote server 186 and the computing platform 104. It is noted that, the remote server 186 is used as a general term throughout the present disclosure and may refer to any cloud-based services involving multiple servers, computers, devices and the like. The computing platform 104 may be further configured to communicate with one or more seat sensors 176 configured to sense and measure the occupancy of one or more vehicle seat. The seat sensor 176 may be provided with weight measuring features allowing the computing platform 104 to determine or estimate the type of passengers on the seat (e.g. a child or adult). The seat sensor 176 may additionally receive seat belt information, such as whether a seat belt is fastened or a length of extension of the seat belt. The seat sensor 180 may also receive information indicative of whether a car seat is attached to LATCH clips or other information indicative of the placement of a child car seat in a seating location. Additionally or alternatively, the seat sensor 176 may be implemented via any electro/mechanical sensors configured to detect the presence of one or more vehicle user inside or at a vicinity of the vehicle 102 without the utilization of a seat (e.g. for standing passengers of a bus).

Figure 2:
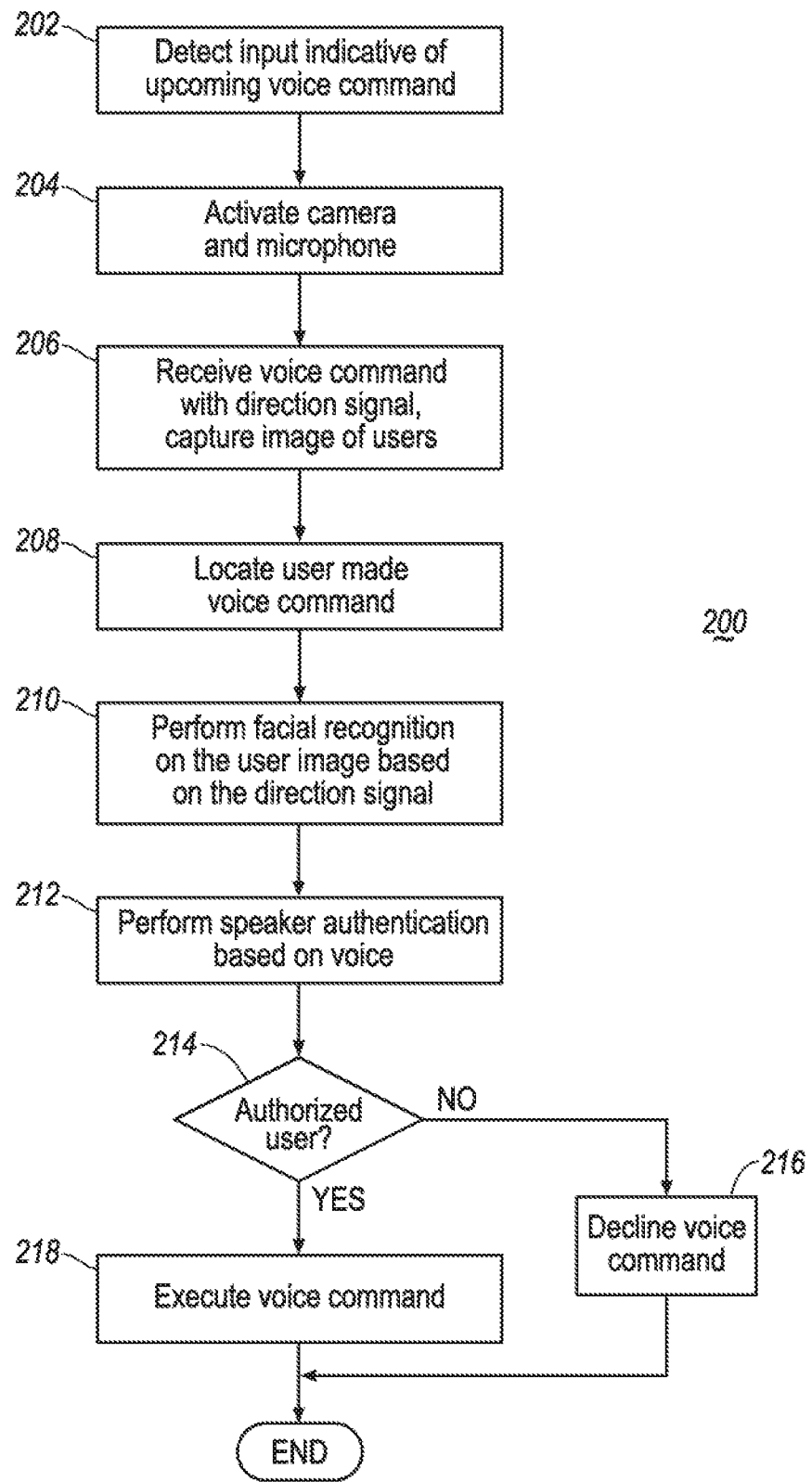
FIG. 2 illustrates an example flow diagram for a process of one embodiment of the present disclosure.

Referring to FIG. 2, a flow diagram for a process 200 of one embodiment of the present disclosure is illustrated. With continuing reference to FIG. 1, at operation 202, the computing platform 104 detects an input indicative of a voice command input by a user. The input may be received via one or more button (not shown) in association with the HMI controls 120. Additionally or alternatively, the input may be a predefined phrase such as "voice command" and actively received via the microphone 126 using speech recognition technologies. Responsive to receiving the input, at operation 204, the computing platform 104 activates the interior camera 118 and microphone 126 to receive audio and video inputs from the user. At operation 206, the computing platform 104 receives a voice command made from the user and captures one or more images of the cabin of the vehicle 102. As discussed above, the microphone 126 may be provided with direction-detecting feature and at operation 208 the computing platform 104 detects and determines the direction or location where the voice command is made using the direction information from the microphone 126 and/or the audio controller 122. In case that the camera 118 is movable, the computing platform may further move the camera 118 in the direction of or focus on the location of the voice command source to capture an image.

Responsive to detecting the location/direction of the source of the voice command, at operation 210, the computing platform 104 performs facial recognition on the image captured inside the vehicle cabin using the location/direction of the source. The camera may capture one or more pictures inside the vehicle cabin of multiple user/occupants of the vehicle responsive to detecting the voice command. Using the location/direction of the source of the voice command, the computing platform 104 may be able to focus on a specific location of the vehicle cabin to perform the facial recognition. Facial images of authorized users may be previously recorded and stored in the storage 106 e.g. as a part of the vehicle data 110. By comparing the facial image captured via the interior camera 118 with the previously stored images using image processing and facial recognition technologies, the computing platform 104 may determine if the user making the voice command is authorized. Additionally or alternatively, the computing platform 104 further performs a voice print recognition analysis on the voice command received via the microphone 126 to further determine the identity of the user at operation 212. The voice print of the authorized user may be pre-recorded and stored in the storage 106. If the computing platform 104 determines that voice command is from an unauthorized user through the facial recognition and/or the voice print recognition at operation 214, the process proceeds to operation 216 and the computing platform declines the voice command. A feedback may be provided to the vehicle user informing the declination of the voice command. Otherwise, if the computing platform 104 detects the voice command is from an authorized user such as a previously registered vehicle owner, the process proceeds to operation 218 and the computing platform 104 executes the voice command and provide a feedback to the user.

The operations of the process 200 may be applied to various situations. For instance, multiple occupants/users may share a ride in the vehicle 102. Among those users, a driver sitting on the driver's seat may be an authorized user for certain voice commands such as playing messages or load emails, and passenger sitting at the rear-right seat is an unauthorized user for such commands. For instance, when the computing platform 104 detects a voice command such as "play my message," it is important to determine the source/identity of the user who made such command and verify if the user is authorized to do so before executing it for privacy and security concerns.

When multiple users are present in the vehicle cabin, facial recognition alone may be insufficient for identification purposes as it may still unclear which user made the voice command. Therefore, knowing the location of the user who made the voice command may be helpful in this situation. Responsive to determining where the user who made the voice command sits inside the vehicle cabin, the computing platform 104 may focus on that specific location to perform facial recognition. For instance, if the "play my message" voice command is made by the unauthorized passenger sitting on the rear-right seat, the computing platform 104 may detects his/her location via the microphone 126 and only perform facial recognition on the image for the rear-right seat passenger. In this case, the computing platform 104 may decline to execute the voice command responsive to the authentication fails, even if the authorized driver for such voice command is also in the image captured via the camera 118. However, if the command is made by the driver, the authentication will succeed under the same principle and the computing platform 104 may proceed to execute the voice command.

Additionally or alternatively, the process 200 may be applied to different scenarios under the same principle. For instance, the vehicle 102 may be provided with multi-zone heating, ventilation, and air conditioning (HVAC) system configured to allow users on different seat to adjust temperatures individually. Responsive to receiving a voice command such as "set temperature to 70" the computing platform 104 may identify which user made such voice command, and only adjust the temperature to the specific temperature-zone where that user is located responsive to a successful authentication. This feature may be particularly useful in situations such as, a parent may not allow a child passenger to set a temperature below a certain degree (e.g., 70 degrees Fahrenheit). The parent may preconfigure the computing platform 104 to associate the minimum temperature with the child passenger regardless of which seat the child is in. Therefore, even if the child passenger changes seat in the course of the ride and made the voice command, the computing platform 104 may still identify the child and control the temperature settings accordingly.

Figure 3:
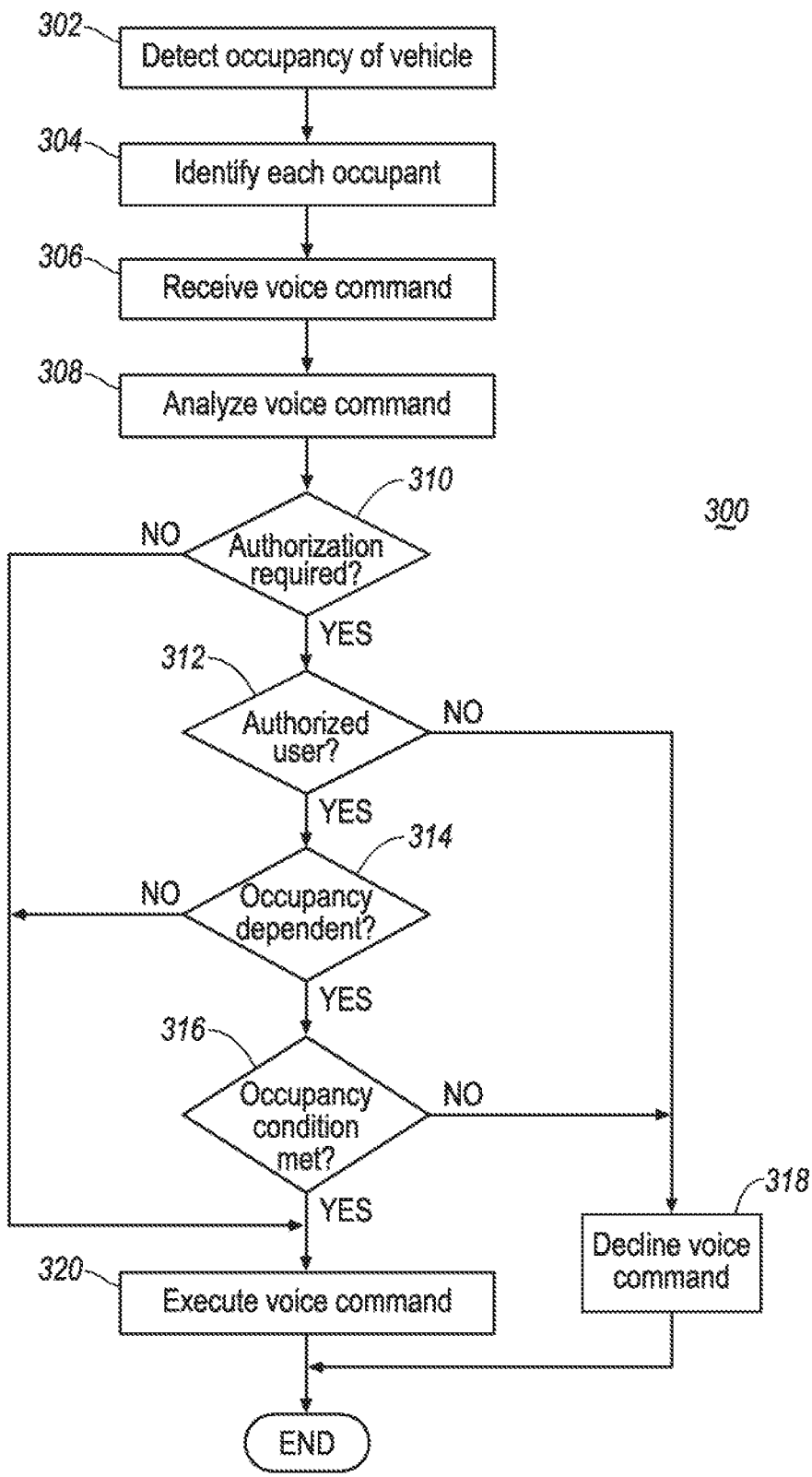
FIG. 3 illustrates an example flow diagram for a process of another embodiment of the present disclosure.

Referring to FIG. 3, a process 300 of another embodiment of the present disclosure is illustrated. At operation 302, the computing platform 104 detects the occupancy of the vehicle 102 including information about how many occupants are there in the vehicle and the location of each occupant. This operation may be performed each time one or more occupants enter or exit the vehicle 102 and/or the vehicle 102 start to drive. The detection may be performed via various means including but not limited to, signals from one or more seat sensors 176, voice direction signals from the microphone 126, and/or images captured via the interior camera 118. Responsive to detecting the occupancy of the vehicle 102, at operation 304, the computing platform 104 identifies each occupant detected within the cabin of the vehicle 102. The identification may be performed via the image captured by the interior camera 118 with facial recognition technology. Additionally, the computing platform 104 may identify one or more occupants of the vehicle 102 via a user profile associated with the mobile device 140 connected to the computing platform 104 via the wireless connection 190. The mobile device 140, as discussed above, may be previously registered with the computing platform 104 associated with a particular user creating a user profile stored in the storage 106 and/or the mobile storage 142, e.g., as a part of the vehicle data 110 and/or the mobile data 146 respectively. Additionally or alternatively, the identification may be performed by sending user information (e.g. a user facial image and/or a user profile) to the server 186 and receiving identification information from the server 186.

At operation 306, the computing platform 104 receives a voice command from a user of the vehicle 102 via the microphone 126. In response, the computing platform 104 analyzes the voice command at operation 308 to obtain various information such as the location/direction of the source of the command, the content of the voice command, whether the voice command needs authorization, and/or whether the voice command is occupancy-dependent. Additionally, the computing platform 104 may further analyze the voice print of the source of the voice command to determine the authenticity of the source. For instance, the computing platform 104 may be configured to allow different levels of authorization for different voice commands. A voice command such as "what is the current time" may be set to a universal level of authorization such that no authorization is required. On the other hand, a voice command such as "play messages" as discussed above may require certain level of authorization.

At operation 310, responsive to detecting an authorization is required for the voice command, the process proceeds to operation 312. Otherwise, if the authorization is not required, the process proceeds to operation 320 to execute the voice command directly. At operation 312, the computing platform 104 determines if the user who made the voice command is authorized for such specific voice command using the identification result from operation 304. If the user is not authorized, the process proceeds to operation 318 and the computing platform 104 declines the voice command. Otherwise, if the user is authorized, the process proceeds from operation 312 to operation 314 to further determine if the specific command to that specific authorized user is occupancy-dependent. As an example, a parent vehicle owner may only authorize a child passenger to listen to some specific radio channels or play some predefined video/audio when the parent is present in the vehicle. And the parent may preconfigure the computing platform 104 in this manner. In this case, operation 314 becomes useful to make such determination. If the answer for operation 314 is a no, the process proceeds to operation 320. Otherwise, responsive to detecting the voice command to the user is occupancy-dependent, the process proceeds to operation 316 and the computing platform 104 detects if the occupancy condition for the voice command is met. Following the above example, the occupancy condition is met if the computing platform 104 detects that the parent is inside the vehicle 102 and the process proceeds to operation 320 for execution. Otherwise, the process proceeds to operation 318 to decline the voice command.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
    a controller, programmed to
        responsive to detecting a voice command from a dependent user associated with a primary user and a location of the dependent user inside the vehicle via a microphone, analyze the voice command and authenticate an identity of the dependent user using facial recognition on an image captured, by a camera, of the location of the dependent user;
        responsive to an analysis result indicating an execution of the voice command depends on a presence of the primary user and a successful authentication of the dependent user, authenticate an identity of a primary user inside the vehicle, and
        responsive to a successful authentication of the primary user, execute the voice command.

2. The vehicle of claim 1, wherein the controller is further programmed to authenticate the identity of the dependent user using voice print analysis on the voice command received.

3. The vehicle of claim 1, wherein the controller is further programmed to detect the location of the dependent user using a signal from a seat sensor.

4. The vehicle of claim 1, wherein the controller is further programmed to authenticate the identity of the primary user via a mobile device wirelessly connected to the vehicle and having a user profile of the primary user.

5. The vehicle of claim 1, wherein the controller is further programmed to send the image of the dependent user to a server via a communication network through a telematics control unit (TCU) and receive authentication of the dependent user from the server in response.

6. The vehicle of claim 1, wherein the controller is further programmed to analyze the voice command to detect whether an authentication is required.

7. The vehicle of claim 1, wherein the controller is further programmed to
    control one or more cameras to capture one or more images of a vehicle cabin; and
    authenticate the identity of the primary vehicle user with facial recognition on the one or more images captured by the one or more cameras.

8. The vehicle of claim 1, wherein the controller is further programmed to authenticate the identity of the primary vehicle user by sending a user profile of the primary vehicle user to a server via a TCU.

9. The vehicle of claim 1, wherein the controller is further programmed to move the camera toward the location of the dependent user from who the voice command is made.

10. A vehicle, comprising:
    a controller, programmed to
        responsive to detecting a door opening or closing event, detect an occupancy of the vehicle via a camera, and authenticate an identity of a primary user and an identity of a dependent user associated with the primary user via facial recognition on an image captured via the camera,
        responsive to receiving a voice command from a dependent user via a microphone, analyze the voice command to identify that an execution of the voice command depends on a presence of the primary user, and
        responsive to a successful authentication of the primary user within the vehicle, execute the voice command.

11. The vehicle of claim 10, wherein the controller is further programmed to detect an occupancy of the vehicle via a seat sensor.

12. The vehicle of claim 10, wherein the controller is further programmed to authenticate the identity of the primary user via a mobile device with a user profile wirelessly connected to the vehicle.

13. The vehicle of claim 12, wherein the controller is further programmed to authenticate the identity of the primary user by sending the user profile to a server via a TCU and receiving authentication from the server.

14. The vehicle of claim 10, wherein the controller is further programmed to identify, among the primary user and the dependent user, a source user who made the voice command via a location signal sent from the microphone provided with an omni-direction feature.

15. A method for a vehicle, comprising:
responsive to receiving an input indicative of an upcoming voice command, activating an omni-directional microphone and a camera;
receiving a voice command from a first user via the microphone;
detecting a direction from which the voice command is received via the microphone;
capturing an image inside a vehicle cabin via the camera;
authenticating an identity of the first user by facial recognition on the image based on the direction received from the microphone; and
responsive to detecting an execution of the voice command depends on a presence of a second user, authenticating an identity of the second user by facial recognition on the image; and
responsive to successful authentications of the first user and second user both present in the vehicle, executing the voice command.

16. The method of claim 15, further comprising:
rotating the camera to focus on the direction received from the microphone.

17. The method of claim 15, further comprising:
authenticating the identity of the user by voice print analysis on the voice command received.

* * * * *